W. H. GRAVER.
VEHICLE RAISER.
APPLICATION FILED MAR. 7, 1916.
1,204,973.
Patented Nov. 14, 1916.
2 SHEETS—SHEET 1.
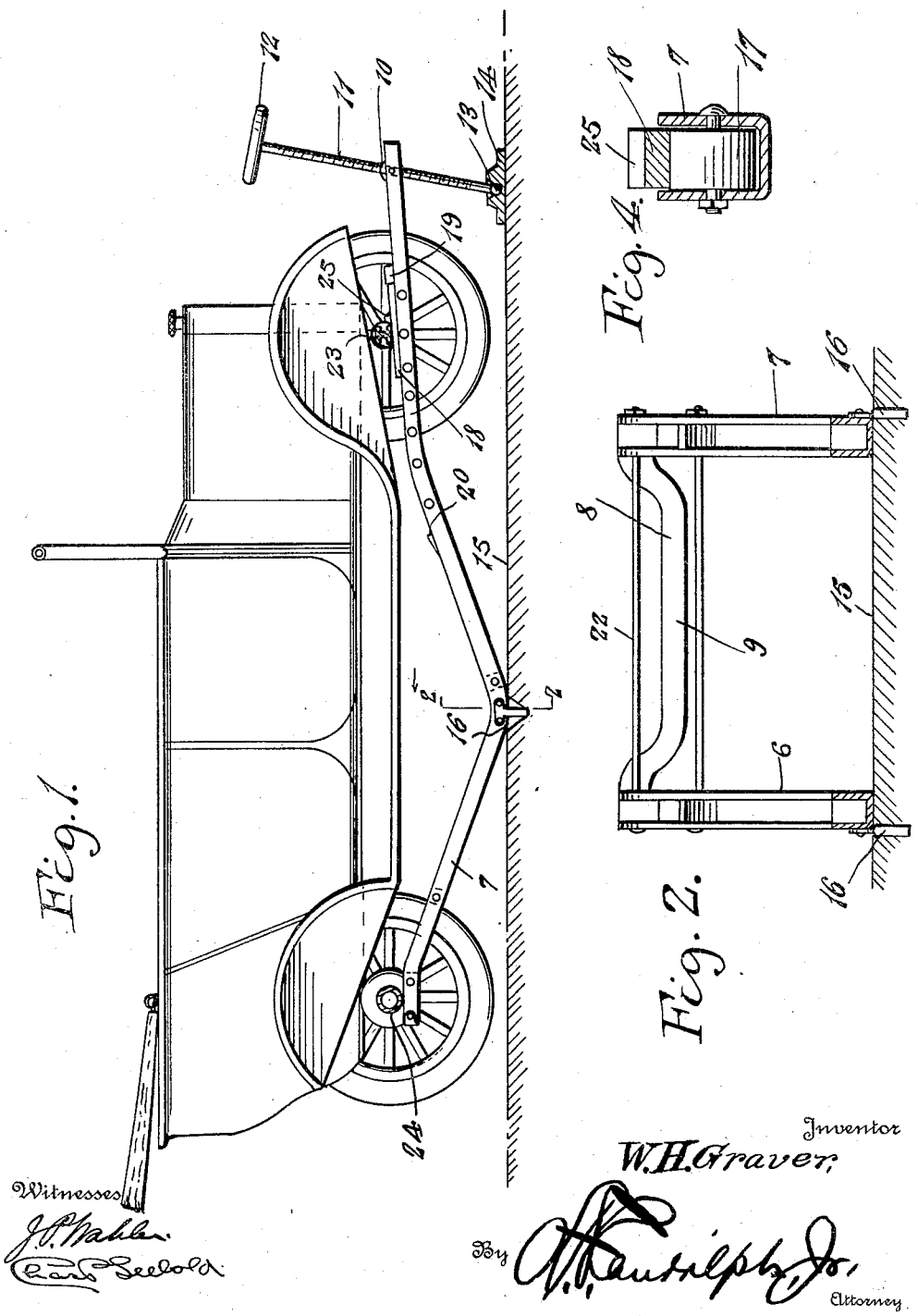
Witnesses
J. P. Wahler
Carl Seebold
Inventor
W. H. Graver,
By A. Randolph, Jr.
Attorney W. H. GRAVER.
VEHICLE RAISER.
APPLICATION FILED MAR. 7, 1916.
1,204,973.
Patented Nov. 14, 1916.
2 SHEETS—SHEET 2.
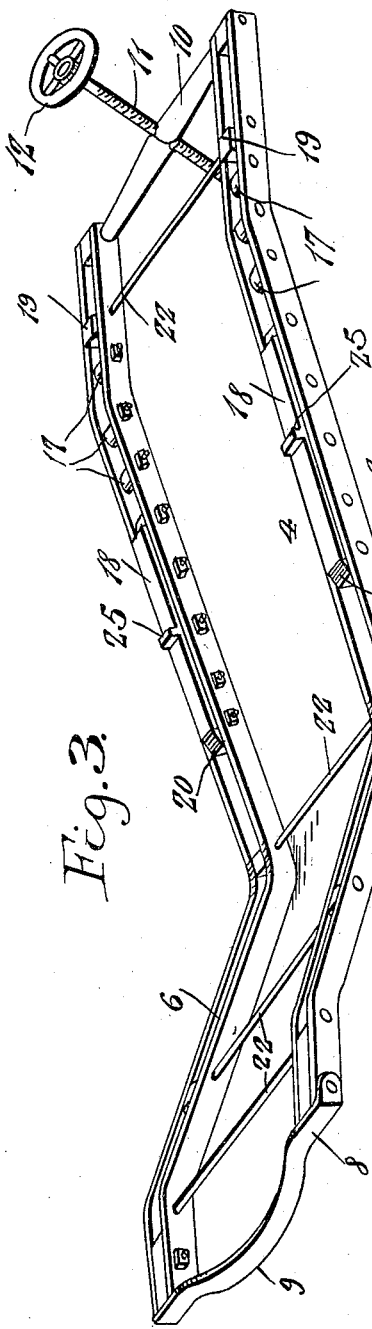
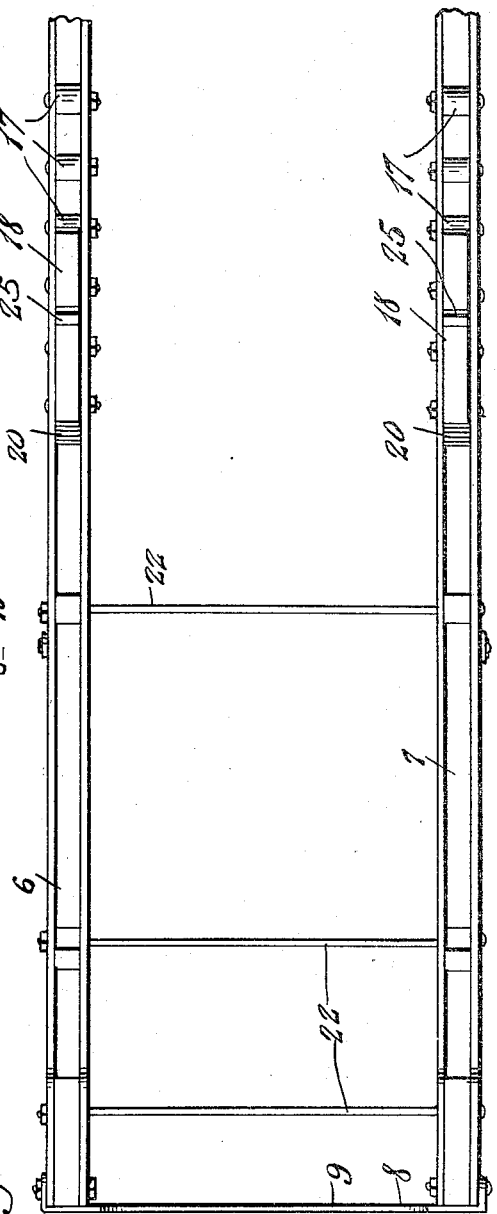

UNITED STATES PATENT OFFICE.

WILLIAM H. GRAVER, OF DILLSBORO, INDIANA.

VEHICLE-RAISER.

1,204,973. Specification of Letters Patent. Patented Nov. 14, 1916.

Application filed March 7, 1916. Serial No. 82,672.

*To all whom it may concern:*

Be it known that I, WILLIAM H. GRAVER, a citizen of the United States, residing at Dillsboro, in the county of Dearborn and State of Indiana, have invented certain new and useful Improvements in Vehicle-Raisers; and I do hereby declare the following to be a full, clear, and exact description of the invention, such as will enable others skilled in the art to which it appertains to make and use the same.

This invention has for its object to provide an improved vehicle raiser particularly adapted for lifting or raising motor vehicles equipped with pneumatic tires, so as to relieve the latter of the weight of the vehicle when not in use and thereby prolong their life.

Another object is the provision of a vehicle raiser embodying a tilting frame and means for adjusting and retaining the frame in adjusted position.

With these and other objects in view, the invention consists in the novel construction, combination and arrangement of parts as will be hereinafter specifically described, claimed and illustrated in the accompanying drawings, in which:

Figure 1 represents a side elevation of the vehicle raiser applied to use, Fig. 2 represents a vertical sectional view on the line 2—2 of Fig. 1, Fig. 3 represents a perspective view of the vehicle raiser, Fig. 4 represents a detail sectional view on the line 4—4 of Fig. 3, and Fig. 5 represents a top plan view of the raiser.

Referring to the drawing in detail, wherein similar reference numerals designate corresponding parts throughout the several views, the numerals 6 and 7 indicate a pair of spaced parallel channel irons, which are connected at their rear ends by a transverse connecting member 8, having the downwardly turned medial portion 9 to accommodate the differential gear of a motor vehicle. The forward extremities of the longitudinal members 6 and 7 are connected by a rotatable roller 10, having a centrally located and internally screw threaded aperture receiving an adjusting screw 11, carrying a hand wheel 12 at the upper end and a ball 13 at the lower end swivelly mounted in a socket 14 secured to the floor or other support 15.

The opposite ends of the longitudinal members 6 and 7 are extended in substantial alinement, while the medial portions of said members are substantially V-shaped, thereby providing fulcrums upon which the frame may be tilted. Anchoring pins 16 are connected with the fulcrum points of the members 6 and 7 and are adapted to be loosely fitted in recesses formed in the floor or support 15 for preventing longitudinal movement of the frame upon the floor.

The horizontal forward ends of the longitudinal members 6 and 7 and the adjacent rearwardly inclined portions thereof are provided with a plurality of adequately spaced rotatable rollers 17, which are mounted between the parallel members of each channel iron 6 and 7, and movably support carrying blocks 18. The blocks 18 are guided between the parallel portions of the channel irons or longitudinal members 6 and 7 and are limited in their forward sliding movement by stops 19 secured adjacent the forward ends of the longitudinal members 6 and 7 and in their rearward movement by stops 20 secured intermediate the ends of the longitudinal members 6 and 7. Intermediate their ends the members 6 and 7 are connected by a plurality of transverse brace bars 22.

In use, the tilting frame is adjusted by a screw 11 so as to lower the rear end thereof and permit the front and rear axles 23 and 24, respectively, to move over the rear connecting member 8. As the vehicle moves forwardly over the frame the front axle engages lugs 25 formed upon the upper portions of the sliding blocks 18, thereby carrying the latter forwardly and upwardly over the rollers 7 and elevating the forward end of the vehicle. The forward movement of the vehicle and sliding blocks 18 is limited by the engagement of said blocks with the stops 19. When the forward movement of the vehicle is stopped by the stops 19 the rear horizontally disposed ends of the longitudinal members 6 and 7 are disposed directly under the rear axle 24, and thus when the adjusting screw 11 is adjusted to lower the forward end of the frame and elevate the rear end thereof the vehicle is elevated above the ground.

What I claim is:

1. A vehicle raiser including a frame embodying a pair of spaced longitudinal members having V-shaped medial portions, a socket adapted for connection with a suitable support, vehicle operated blocks slidably mounted on said longitudinal members, and a screw swivelly mounted in said socket and extending through one end of said frame for adjusting the latter.

2. A vehicle raiser comprising a frame including a pair of spaced longitudinal members having V-shaped medial portions, means for limiting longitudinal movement of said frame upon a support, vehicle operated blocks slidably mounted adjacent one end of the pair of longitudinal members, a socket adapted for connection with a suitable support, and a screw swivelly mounted in said socket and connected with the end of said frame supporting said blocks for tilting the frame.

3. A vehicle raiser comprising a frame including a pair of spaced longitudinal members having V-shaped medial portions and a plurality of members connecting said longitudinal members, means for securing said frame against longitudinal movement upon a support, a series of rollers mounted in the forward end of each of said longitudinal members, stops at the opposite ends of each series of rollers, blocks movable over said rollers, stops carried by said blocks, and a screw connected with the forward extremity of said frame for tilting the latter.

4. A vehicle raiser comprising a frame including spaced parallel longitudinal members constructed of channel iron, and a plurality of transverse connecting members, a series of rollers rotatably mounted between the side members of the forward end of each of said longitudinal members, blocks movably supported upon said rollers, stops arranged at the opposite ends of each series of rollers, and a screw connected with the forward extremity of said frame for adjusting the latter.

In testimony whereof I affix my signature in presence of two witnesses.

WILLIAM H. GRAVER.

Witnesses:
JAMES W. BAILEY,
HENRY NIESTER.

Copies of this patent may be obtained for five cents each, by addressing the "Commissioner of Patents, Washington, D. C."